US012737471B2

(12) United States Patent
Koohestani et al.

(10) Patent No.: US 12,737,471 B2
(45) Date of Patent: Sep. 15, 2026

(54) MUTABLE CODE EFFICIENCIES IN MEASURED SECURE BOOT FOR HARDWARE ROOT OF TRUST

(71) Applicants: Advanced Micro Devices, Inc, Santa Clara, CA (US); ATI Technologies ULC, Markham (CA)

(72) Inventors: Seyed Ehsan Koohestani, Woodbridge (CA); Fabrizio Damato, Folsom, CA (US); John Paul Traver, Fillmore, CA (US); Louis Albert Ferraro, Forest Lake, MN (US); Jonathan Luke Mahowald, Folsom, CA (US); Piotr Michal Kwidzinski, Folsom, CA (US)

(73) Assignees: Advanced Micro Devices, Inc, Santa Clara, CA (US); ATI Technologies ULC, Markham (CA)

( * ) Notice: Subject to any disclaimer, the term of this patent is extended or adjusted under 35 U.S.C. 154(b) by 178 days.

(21) Appl. No.: 18/902,530

(22) Filed: Sep. 30, 2024

(65) Prior Publication Data

US 2026/0093816 A1 Apr. 2, 2026

(51) Int. Cl.
*G06F 21/57* (2013.01)

(52) U.S. Cl.
CPC .................................. *G06F 21/575* (2013.01)

(58) Field of Classification Search
CPC .................................................... G06F 21/575
See application file for complete search history.

(56) References Cited

U.S. PATENT DOCUMENTS

2009/0204964 A1* 8/2009 Foley ...................... G06F 21/53 718/1
2014/0115689 A1* 4/2014 Lee ........................ G06F 21/53 726/16
(Continued)

FOREIGN PATENT DOCUMENTS

EP 4357953 A1 * 4/2024 ........... G06F 21/575
GB 2457172 A * 8/2009 ............ H04L 67/34
(Continued)

OTHER PUBLICATIONS

Trusted Computing Group , “Dice Dice Dice Dice Dice Layering Layering Layering Layering Layering Layering Layering Layering Layering ArchArchArchArchitectureitectureitectureitectureitecture itectureitectureitecture”, Version 1.0, Revision 0.19, Jul. 23, 2020, 30 pages.

*Primary Examiner* — Faisal M Zaman
(74) *Attorney, Agent, or Firm* — FIG. 1 Patents

(57) ABSTRACT

Mutable firmware commonality for hardware root of trust is described. In at least one aspect, a system includes a volatile memory circuit having a first region that persistently stores a reusable portion of instructions executed during a boot sequence for establishing a hardware root of trust among multiple security layers of a security framework, and a second region that is overwritten during the boot sequence with each layer-specific portion of the instructions executed sequentially to implement a corresponding security layer based on the reusable portion. The system further includes a processing circuit that sequentially establish the hardware root of trust one security layer at a time by loading the second region of the volatile memory with a current layer-specific portion of the instructions that are executed in combination with the reusable portion of the instructions to implement a current security layer.

20 Claims, 5 Drawing Sheets

(56) References Cited

U.S. PATENT DOCUMENTS

2015/0058979 A1* 2/2015 Peeters ................. G06F 21/575
726/22
2016/0352733 A1* 12/2016 Oxford ................. H04L 9/0866
2019/0081788 A1* 3/2019 Rose ..................... H04L 9/3226
2022/0038272 A1* 2/2022 Hershman ............. H04L 9/0866
2022/0245252 A1* 8/2022 Smith ................... G06F 21/572
2023/0342472 A1* 10/2023 Shao ....................... G06F 21/74
2023/0396449 A1* 12/2023 Orlando ................ H04L 9/3265
2024/0078315 A1* 3/2024 Chu ...................... H04L 9/3247
2024/0303380 A1* 9/2024 Ponnuru ................. G06F 21/33
2025/0119304 A1* 4/2025 Park ...................... H04L 9/3268
2026/0093816 A1* 4/2026 Koohestani ........... G06F 21/575

FOREIGN PATENT DOCUMENTS

WO WO-2023287523 A1 * 1/2023 ........... G06F 21/572
WO WO-2023212178 A1 * 11/2023 ........... H04L 9/0866

* cited by examiner

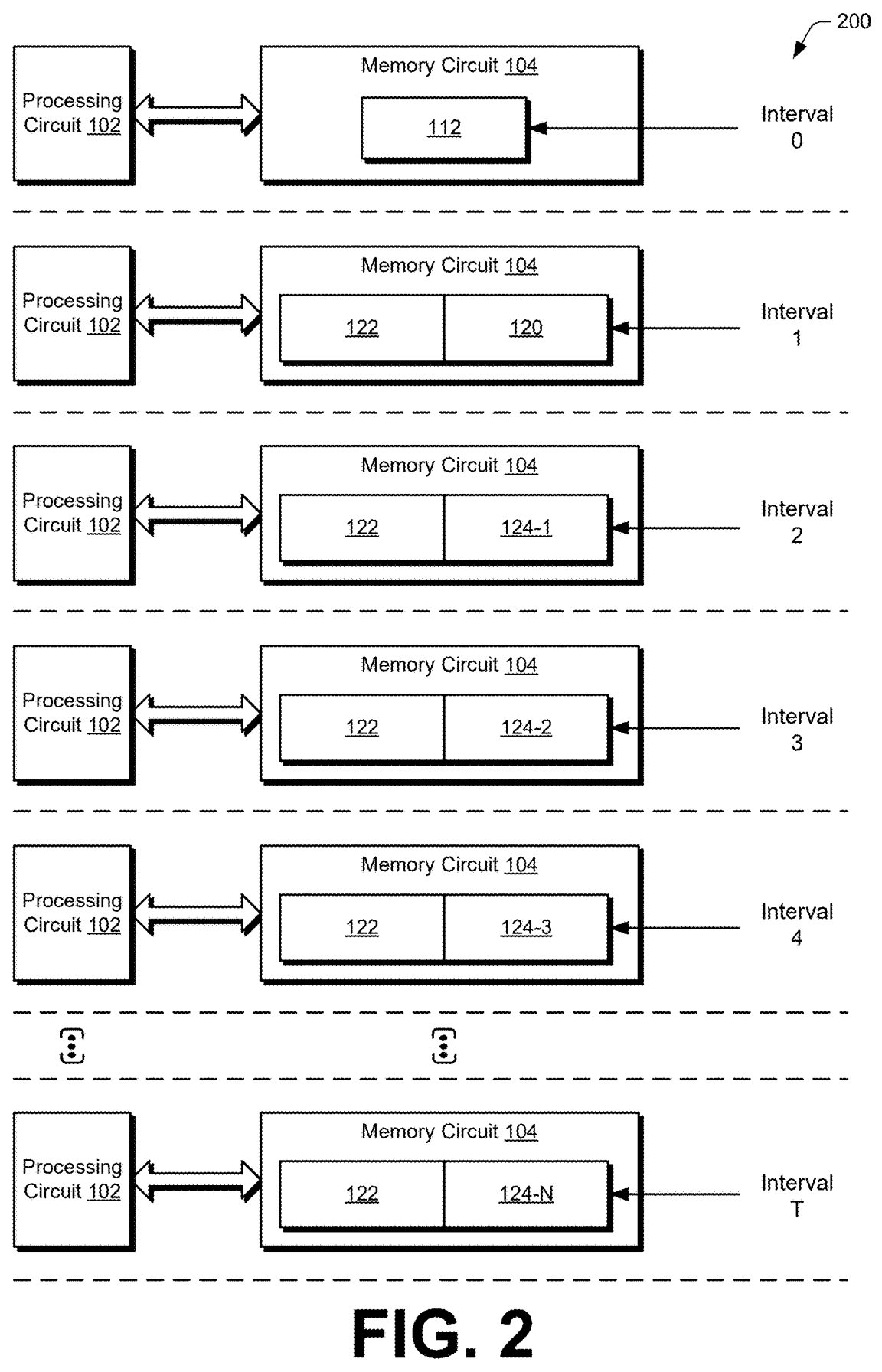

200

Processing Circuit 102
Memory Circuit 104
112
Interval 0

Processing Circuit 102
Memory Circuit 104
122
120
Interval 1

Processing Circuit 102
Memory Circuit 104
122
124-1
Interval 2

Processing Circuit 102
Memory Circuit 104
122
124-2
Interval 3

Processing Circuit 102
Memory Circuit 104
122
124-3
Interval 4

Processing Circuit 102
Memory Circuit 104
122
124-N
Interval T

FIG. 2

MUTABLE CODE EFFICIENCIES IN MEASURED SECURE BOOT FOR HARDWARE ROOT OF TRUST

BACKGROUND

Modern computing architectures use a security framework to minimize risks, protect device identity, and combat security threats. Part of the framework is called the Root of Trust (RoT), which enables trusted functions for establishing a secure computing environment. The RoT provides device integrity across different hardware and software layers by implementing a chain of trust among the layers for ensuring each subsequent layer is trusted and verified.

BRIEF DESCRIPTION OF THE DRAWINGS

FIG. 2 is a block diagram of a dynamic memory state occurring in a non-limiting example system based on mutable code efficiencies in measured secure boot for hardware root of trust.

DETAILED DESCRIPTION

Overview

Figure 1:
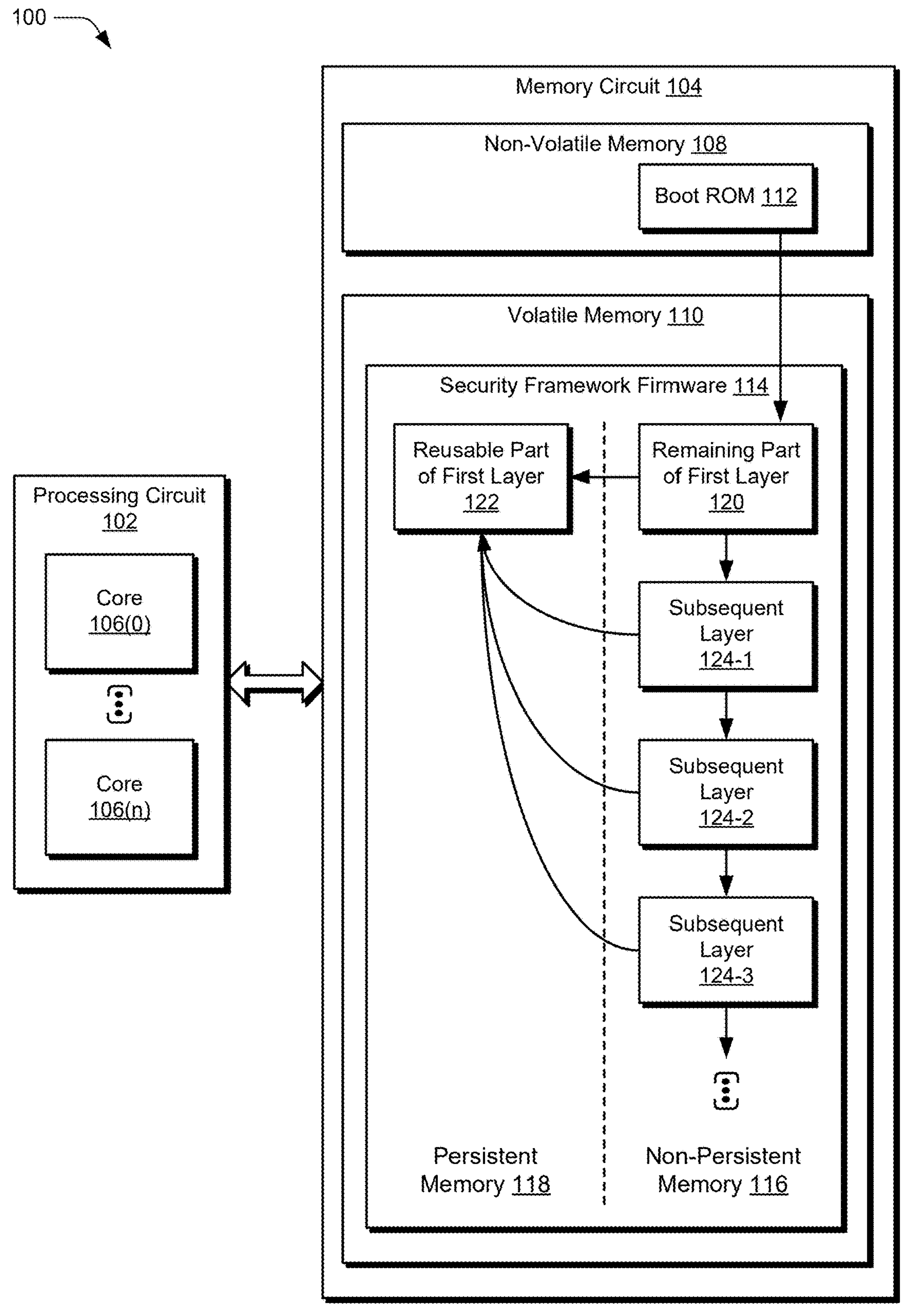
FIG. 1 is a block diagram of a non-limiting example system having a processor circuit communicatively coupled to a memory circuit using mutable code efficiencies in measured secure boot for hardware root of trust.

Modern computing architectures use a security framework built on a Root of Trust (RoT), which enables trusted functions to establish a secure computing environment. The RoT enables device integrity for processes being executed at different hardware and software layers of a computing architecture by implementing a chain of trust among the layers, which ensures each subsequent layer is trusted and verified. For example, the Device Identifier Composition Engine (DICE) is a comprehensive framework developed by the Trust® Computing Group (TCG), which uses RoT techniques to facilitate hardware-based cryptographic device identity, attestation, and data encryption. The DICE architecture provides measured secure boot evidence by using one-way cryptographic solutions to verify the authenticity of loaded images across different layers.

Despite the security benefits, conventional RoT frameworks are impractical for various high-performance or embedded systems. Conventional security frameworks that adopt DICE or other RoT techniques introduce inefficiencies, such as processing delays and added consumption of resources. For example, conventional DICE architectures inefficiently handle portions of mutable code. Same or similar code is replicated among the different layers of a device to reimplement same or similar functions. In a conventional DICE framework, immutable code (e.g., a Boot ROM) implements an initial layer (e.g., Layer 0), and first mutable code is contained in first layer (e.g., Layer 1). When a subsequent layer is loaded (e.g., Layer 2), the entire first mutable code is either discarded or overwritten, even though the subsequent layer reimplements at least part of the same functionality of the first mutable code. Implementing each subsequent layer by replicating the same complex sections of mutable code among different sections of firmware causes inefficiencies, in addition to potential security vulnerabilities.

In contrast to conventional frameworks, mutable code efficiencies in measured secure boot for hardware root of trust is described. Rather than replicating the same complex instruction and/or data sets across multiple, distinct mutable code sections of firmware, functionality shared between multiple layers of a security framework is exploited to improve security, performance, and efficiency in measured secure boot for maintaining a root of trust among the multiple layers.

In at least one example, a device performs a boot sequence that loads and executes firmware to establish a root of trust among multiple security layers of the device. At the start of the boot sequence, a device boot ROM causes first mutable code of the firmware to be loaded into a device memory for executing processes of a first layer. After the first mutable code is executed, respective processes of each subsequent layer are executed to complete the boot sequence. For example, in addition to the first mutable code, the firmware includes a corresponding section of mutable code for a second layer, a third layer, and so forth. In at least one implementation, the mutable code of the first layer and each subsequent layer is loaded and executed, sequentially, throughout the boot sequence.

Each mutable code section in the firmware is distinct. Despite the differences between the mutable code sections, the mutable code of each of the subsequent layers (e.g., a plurality of subsequent layers or all of the subsequent layers) is configured to perform same or similar functionality as part of the first mutable code. For example, the first layer and a second layer both execute device identity processes that depend on a shared function (e.g., one or more common security and cryptographic functions) used throughout the security framework to provide evidence that contains a footprint of a subsequent layer. At least part of the functionality enabled by the first mutable code is replicated during execution of second mutable code loaded for the second layer.

Rather than replicate a same set of complex instructions across multiple sections of firmware to implement overlapping functionality, the device anchors a reusable part of the first mutable code in a persistent region of the memory. The reusable mutable code is preserved (e.g., persistently stored in memory) throughout the boot sequence, whereas a remaining part of the first mutable code (e.g., a distinct part) is loaded in a non-persistent region of the memory that is overwritten by subsequent mutable code. Execution of the subsequent mutable code relies on the reusable parts of the first mutable code to perform same or similar security and cryptographic functions. For example, the first layer and each subsequent layer execute device identity and attestation processes that depend on a same security and cryptographic functions implemented by the reusable part of the first mutable code. As one example, the reusable parts of the first mutable code support an application program interface (API) that is accessible to each of the subsequent layers. Subsequent mutable code executed by the second layer, for instance, is configured to invoke the API (e.g., as a function call) to implement the same security and cryptographic functions within the second layer. The subsequent mutable code communicates through the API to cause the reusable parts stored in persistent memory to perform the same security and cryptographic functions on behalf of the second layer.

Division of the first mutable code into reusable and remaining parts allows for more efficient management of computing resources. Common instruction and/or data sets are shared by multiple layers of a security framework, rather than being reproduced in different mutable code sections of firmware. For example, subsequent layers are operable to reuse trusted functions or services implemented by the first layer. Preserving parts of the first mutable code reduces size and complexity of subsequent code that is loaded and executed to implement each subsequent layer. Complexity of device firmware is reduced, which helps for validation and configuration management of a security framework. In addition, less memory is used to load subsequent layers of mutable code, which saves boot time and conserves computing resources. Through careful management and division of the first mutable code, security, performance, and efficiency of a multi-layered security framework is improved, overall. Implementation of the described techniques for achieving mutable code efficiencies in measured secure boot for hardware root of trust has the potential to increase adoption of multi-layer security frameworks among a wide range of devices that vary in capability and available resources.

In some aspects, the techniques described herein relate to a system including: a volatile memory circuit having a first region that persistently stores a reusable portion of instructions executed during a boot sequence for establishing a hardware root of trust among multiple security layers of a security framework, and a second region that is overwritten during the boot sequence with each layer-specific portion of the instructions executed sequentially to implement a corresponding security layer based on the reusable portion, and a processing circuit that sequentially establish the hardware root of trust one security layer at a time by loading the second region of the volatile memory with a current layer-specific portion of the instructions that are executed in combination with the reusable portion of the instructions to implement a current security layer.

In some aspects, the techniques described herein relate to a system, wherein the processing circuit executes the current layer-specific portion of the instructions in combination with the reusable portion of the instructions to implement the current security layer prior to overwriting the second region of the volatile memory with a subsequent layer-specific portion of the instructions that are executed in combination with the reusable portion of the instructions to implement a subsequent security layer.

In some aspects, the techniques described herein relate to a system, wherein the reusable portion of the instructions include mutable code for executing at least one shared function to implement each of the security layers.

In some aspects, the techniques described herein relate to a system, wherein the mutable code enables an application program interface for accessing the shared function from the current security layer.

In some aspects, the techniques described herein relate to a system, wherein the shared function generates a next compound device identifier used to implement a subsequent security layer.

In some aspects, the techniques described herein relate to a system, wherein the shared function further generates a next device identifier key pair used to implement the subsequent security layer.

In some aspects, the techniques described herein relate to a system, wherein the shared function further generates a current certificate that binds a device identity to an initial state of the current security layer.

In some aspects, the techniques described herein relate to a system including: a storage device including instructions for establishing a hardware root of trust among multiple security layers of a security framework, a memory circuit loaded with a reusable portion of the instructions for executing at least one shared function implemented by each of the security layers, and a layer-specific portion of the instructions for implementing a corresponding security layer based on the shared function, and a processing circuit that implements the security layers to sequentially establish the hardware root of trust one security layer at a time by loading the memory circuit with the layer-specific portion of the instructions that are executed to implement a current security layer prior to loading the memory circuit with the layer-specific portion of the instructions that are executed to implement a subsequent security layer.

In some aspects, the techniques described herein relate to a system, wherein the instructions include firmware executed by the processing circuit to perform a boot sequence that establishes the hardware root of trust.

In some aspects, the techniques described herein relate to a system, wherein the security framework is a Device Identifier Composition Engine based security framework that establishes the hardware root of trust to be a chain-of-trust established between each of the security layers.

In some aspects, the techniques described herein relate to a system, wherein the reusable portion of the instructions enables an application program interface accessed by the layer-specific portion of the instructions being executed to implement the current security layer.

In some aspects, the techniques described herein relate to a system, wherein the reusable portion of the instructions include a reusable part of first mutable code for implementing a first security layer.

In some aspects, the techniques described herein relate to a system, wherein the processing circuit implements the security layers to sequentially establish the hardware root of trust one security layer at a time by overwriting the layer-specific portion of the instructions that are loaded in the memory circuit to implement the current security layer with the layer-specific portion of the instructions that are executed to implement the subsequent security layer.

In some aspects, the techniques described herein relate to a system, wherein the memory circuit includes: a volatile memory circuit having a persistent region that stores the reusable portion of the instructions and a non-persistent region that stores the layer-specific portion of the instructions of the current security layer.

In some aspects, the techniques described herein relate to a system, wherein the memory circuit further includes: a non-volatile memory circuit that stores a boot ROM for defining a system hardware identifier used by the shared function.

In some aspects, the techniques described herein relate to a system, wherein the processing circuit executes the boot ROM to store the system hardware identifier in the volatile memory circuit with the reusable portion of the instructions.

In some aspects, the techniques described herein relate to a system, wherein the processing circuit stores the system hardware identifier in the volatile memory circuit with the reusable portion of the instructions prior to executing the layer-specific portion of the instructions for implementing a first security layer.

In some aspects, the techniques described herein relate to a method for implementing a security framework among multiple security layers, the method including: loading, by a computing device, first mutable code in a memory of the computing device by storing a reusable part of the first mutable code and a remaining part of the first mutable code, responsive to executing the first mutable code to implement a first layer of the security framework, loading, by the computing device, subsequent mutable code in the memory by overwriting the remaining part of the first mutable code, and executing, by the computing device, the subsequent mutable code to implement a subsequent layer of the security framework by executing the reusable part of the first mutable code to perform at least one security function on behalf of the subsequent mutable code.

In some aspects, the techniques described herein relate to a method, further including: determining that a second subsequent layer follows the subsequent layer in the security framework, responsive to executing the subsequent mutable code to implement the subsequent layer, loading, by the computing device, second subsequent mutable code in the memory by overwriting the subsequent mutable code, and executing, by the computing device, the second subsequent mutable code to implement the second subsequent layer by executing the reusable part of the first mutable code to perform the at least one security function on behalf of the second subsequent mutable code.

In some aspects, the techniques described herein relate to a method, wherein the first mutable code and the subsequent mutable code represent portions of firmware configured to establish a hardware root of trust among the security layers during a boot sequence.

FIG. 1 is a block diagram of a non-limiting example system having a processor circuit communicatively coupled to a memory circuit using mutable code efficiencies in measured secure boot for hardware root of trust. In particular, the system 100 details an example implementation of the described techniques for establishing a trusted execution environment by exploiting mutable code efficiencies of firmware to improve performance and reduce complexity during measured secure boot for establishing a root of trust among multiple security layers of a security framework. Examples of devices in which the system 100 is implemented include, but are not limited to, supercomputers and/or computer clusters of high-performance computing (HPC) environments, servers, personal computers, laptops, desktops, game consoles, set top boxes, tablets, smartphones, mobile devices, virtual and/or augmented reality devices, wearables, medical devices, systems on chips, and other computing devices or systems.

The illustrated system 100 includes a processing circuit 102 and a memory circuit 104, where the processing circuit 102 and the memory circuit 104 are communicatively coupled through a communication interface. As one example, the processing circuit 102 and the memory circuit 104 are communicatively coupled using one or more wired or wireless connections made between the processing circuit 102 and the memory circuit 104. Example wired connections include, but are not limited to buses, e.g., a data bus, interconnects, traces, and planes. For example, the processing circuit 102 communicates with the memory circuit 104 to load and execute instructions for implementing the described techniques.

In one or more implementations, the processing circuit 102 is an electronic circuit that includes at least one core 106. Examples of the processing circuit 102 include, but are not limited to, a central processing unit (CPU), a graphics processing unit (GPU), an inference processing unit (IPU), a field programmable gate array (FPGA), an accelerated processing unit (APU), and a digital signal processor (DSP). In some implementations, the processing circuit 102 includes multiple cores 106. For instance, in the illustrated example, the processing circuit 102 is depicted as including core 106(0) and core 106(*n*), where n represents any integer.

In one or more implementations, the processing circuit 102 is a circuit board, e.g., a printed circuit board, on which the cores 106 are mounted. In some variations, one or more integrated circuits of the cores 106 are mounted on the circuit board of the processing circuit 102. In one or more implementations, the processing circuit 102 is a single integrated circuit device that incorporates the cores 106 on a single chip. In some examples, the processing circuit 102 is composed of multiple chips that implement the cores 106 as vertical ("3D") stacks, placed side-by-side on an interposer or substrate, or assembled via a combination of vertical stacking and side-by-side placement.

The memory circuit 104 is a hardware circuit configured to store instructions (e.g., code and data) that is accessible to the processing circuit 102. Examples of the memory circuit 104 include, but are not limited to, a single in-line memory module (SIMM), a dual in-line memory module (DIMM), small outline DIMM (SODIMM), microDIMM, load-reduced DIMM, registered DIMM (R-DIMM), non-volatile DIMM (NVDIMM), high bandwidth memory (HBM), and the like. In one or more implementations, the cores 106 of the processing circuit 102 are configured to perform various operations based on the instructions stored in regions of memory implemented by the memory circuit 104. The cores 106 are processing units, for instance, which read and execute the instructions, e.g., of a program, examples of which include to add data, to move data, and to branch between instructions.

The memory circuit 104 is a device or system that is used to store information, such as instructions (e.g., code and data), for immediate processing by a core 106 of the processing circuit 102. In one or more implementations, the memory circuit 104 corresponds to semiconductor memory where instructions, data, and/or code are stored within memory cells on one or more integrated circuits.

The memory circuit 104 includes a non-volatile memory 108 and a volatile memory 110. In one or more implementations, the memory circuit 104 is a circuit board, e.g., a printed circuit board, on which the non-volatile memory 108 and the volatile memory 110 are mounted. In some variations, the memory circuit 104 is a single integrated circuit device that incorporates the non-volatile memory 108 and the volatile memory 110 on a single chip. In one or more implementations, one or more integrated circuits of the non-volatile memory 108 are mounted on a first circuit board of the memory circuit 104, and one or more integrated circuits of the volatile memory 110 are mounted on a first circuit board of the memory circuit 104. In some examples, the memory circuit 104 is composed of multiple chips that implement the non-volatile memory 108 and the volatile memory 110 as vertical ("3D") stacks, placed side-by-side on an interposer or substrate, or assembled via a combination of vertical stacking and side-by-side placement.

In one or more examples, the non-volatile memory 108 corresponds to or includes read-only memory (ROM), electrically erasable programmable read-only memory (EEPROM), flash memory, phase-change memory (PCM), magnetoresistive RAM (MRAM), and resistive RAM (ReRAM). In at least one example, the volatile memory 110 corresponds to or includes random-access memory (RAM), dynamic random-access memory (DRAM), synchronous dynamic random-access memory (SDRAM), such as single data rate (SDR) SDRAM or double data rate (DDR) SDRAM, ferroelectric RAM (FeRAM), resistive RAM (RRAM), a spin-transfer torque magnetic RAM (STT-MRAM), and static random-access memory (SRAM).

As depicted in FIG. 1, the non-volatile memory 108 is configured to store a boot ROM 112 for initializing hardware components to execute firmware and software (e.g., of an operating system). In at least one aspect, the boot ROM 112 corresponds to immutable code, which is executed during the initial stages of a boot sequence (e.g., Layer 0). In at least one example, the boot ROM 112 includes code and data executed by the cores 106 to initialize a hardware root of trust established among multiple security layers of a security framework. For example, the boot ROM 112 is executed to implement Layer 0 of a Device Identifier Composition Engine (DICE) based security framework. The boot ROM 112 defines a system hardware identifier used by a shared function executed during implementation of each security layer of a security framework firmware 114. The security framework firmware 114 is executed by the processing circuit 102 to implement the DICE based security framework for establishing a hardware root of trust as a chain-of-trust established between each of the security layers.

The volatile memory 110 is configured to store the security framework firmware 114 for establishing a hardware root of trust among multiple security layers of a security framework defined by the security framework firmware 114, such as a DICE based security framework. The security framework firmware 114 includes instructions (e.g., code and data) executed by the cores 106 to complete the boot sequence initialized in response to execution of the boot ROM 112. As depicted in FIG. 1, the volatile memory 110 is divided into a non-persistent region referred to as non-persistent memory 116 and persistent region referred to as persistent memory 118.

Information maintained in the persistent memory 118 is generally written once during execution of the security framework firmware 114 and remains accessible from the volatile memory 110 throughout the boot sequence. For example, the persistent memory 118 persistently stores a reusable portion of instructions contained in the security framework firmware 114, which are repeatedly executed during the boot sequence.

The reusable portion of the instructions is labeled in FIG. 1 as a reusable part of the first layer 122. The reusable part of the first layer 122, for instance, includes mutable code for executing at least one shared function first implemented in the first layer defined by the security framework firmware 114, which is also implemented in each of the other security layers (e.g., the second layer, the third layer, and so forth) defined by the security framework firmware 114. In at least one aspect, the processing circuit 102 executes the boot ROM 112 to store a system hardware identifier in the persistent memory 118 of the volatile memory 110 among the reusable part of the first layer 122. Although referred to throughout as two different parts, the boot ROM 112 verifies and measures the remaining part of the first layer 120 and the reusable part of the first layer 122 as a single image (e.g., a single portion of the security framework firmware 114). For example, the system hardware identifier is stored by the processing circuit 102 prior to executing the remaining part of the first layer 120, which is the layer-specific portion of the instructions for implementing the first security layer.

Unlike the persistent memory 118, the non-persistent memory 116 is overwritten during execution of the security framework firmware 114 to implement each security layer, sequentially. Information maintained in the non-persistent memory 116 changes throughout the boot sequence. With care being taken to sequentially load and execute each layer-specific part of the security framework firmware 114 using the non-persistent memory 116, the processing circuit 102 is configured to establish the hardware root of trust, one security layer at a time.

In at least one example, to implement the first layer at the beginning of the boot sequence, the remaining part of the first layer 120 of the security framework firmware 114 is loaded in the non-persistent memory 116. The processing circuit 102 implements the first layer by executing the remaining part of the first layer 120 in combination with the reusable part of the first layer 122. After implementing the first layer, the remaining part of the first layer 120 is overwritten in the non-persistent memory 116 by instructions associated with a subsequent layer 124-1 of the security framework firmware 114. After the processing circuit 102 implements the subsequent layer 124-1 by executing subsequent layer 124-1 in combination with the reusable part of first layer 122, the subsequent layer 124-1 is overwritten by instructions associated with a subsequent layer 124-2 of the security framework firmware 114. After the processing circuit 102 implements the subsequent layer 124-2 based in part on executing the reusable part of first layer 122, the subsequent layer 124-2 is overwritten by instructions associated with a subsequent layer 124-3 of the security framework firmware 114. This load and execution of instructions associated with each subsequent layer is repeated until each layer defined by the security framework firmware 114 is implemented.

FIG. 2 is a block diagram of a dynamic memory state 200 occurring in a non-limiting example system based on mutable code efficiencies in measured secure boot for hardware root of trust. The dynamic memory state 200 conveys an example implementation of the system 100, where the information (e.g., instructions, code, data) stored within the memory circuit 104 and executed by the processing circuit 102 changes over time (e.g., over a series of intervals). For example, when viewed from top to bottom, the dynamic memory state 200 spans an entire boot sequence ranging from interval 0 to interval T, where T is any integer.

During the interval 0 (e.g., on power-up or after cycling power), the system 100 initiates a boot sequence for establishing a hardware root of trust among multiple security layers of a security framework (e.g., a DICE based security framework). For example, the boot ROM 112 is loaded in the memory circuit 104 and executed by the processing circuit 102. Execution of the boot ROM 112 configures the processing circuit 102 to implement Layer 0 and invoke the security framework firmware 114 for establishing a chain-of-trust among the multiple security layers, which is rooted in hardware.

During each interval of the boot sequence that occurs after the interval 0, the processing circuit 102 is configured to implement a different security layer and sequentially establish the hardware root of trust, one security layer at a time. In at least one example, the processing circuit 102 executes a different layer-specific portion of the security framework firmware 114 to implement a different corresponding security layer during each of the intervals 1 to T. After implementing a current security layer, the processing circuit 102 is configured to overwrite a current, layer-specific portion of the security framework firmware 114 that is loaded in the memory circuit 104 with the layer-specific portion of the security framework firmware 114 that is to be executed to implement a subsequent security layer.

To improve security, efficiency, and performance of the system 100 throughout the boot sequence, each layer-specific portion of the security framework firmware 114 that is loaded in the memory circuit 104 and executed by the processing circuit 102 relies on a reusable portion of the security framework firmware 114. For example, the reusable portion includes mutable code for implementing a shared function executed by each security layer. The instructions for executing the shared function are persistently stored in the memory circuit 104 during each of the intervals 1 to T.

As one example, during the interval 1, the reusable part of the first layer 122 is loaded in a persistent region of the memory circuit 104, and the remaining part of the first layer 120 is loaded in a non-persistent region of the memory circuit 104. The remaining part of the first layer 120 represents a layer-specific portion of the security framework firmware 114 corresponding to the first security layer. The processing circuit 102 executes the remaining part of the first layer 120 in combination with the reusable portion of the first layer 122 to implement the first security layer.

During the interval 2, the reusable part of the first layer 122 remains loaded in the persistent region of the memory circuit 104, and the subsequent layer 124-1 is loaded in the non-persistent region of the memory circuit 104. The subsequent layer 124-1 represents a layer-specific portion of the security framework firmware 114 corresponding to the second security layer. The processing circuit 102 executes the subsequent layer 124-1 in combination with the reusable portion of the first layer 122 to implement the second security layer. As one example, the reusable portion of the first layer 122 enables an application program interface accessed by the layer-specific portion of the security framework firmware 114 being executed to implement a current security layer. For example, the subsequent layer 124-1 includes one or more function calls to the application program interface of the reusable portion of the first layer 122 to execute one or more shared functions, which are rooted in the implementation of the first security layer.

During the interval 3, the reusable part of the first layer 122 remains loaded in the persistent region of the memory circuit 104, and the subsequent layer 124-2 is loaded in the non-persistent region of the memory circuit 104 to implement the third security layer. As one example, the subsequent layer 124-2 includes one or more references to the application program interface of the reusable portion of the first layer 122 to cause the processing circuit 102 to execute at least one of the shared functions implemented in the first and second security layers.

During the interval 4, the reusable part of the first layer 122 remains loaded in the persistent region of the memory circuit 104, and the subsequent layer 124-3 is loaded in the non-persistent region of the memory circuit 104 to implement the fourth security layer. For example, the processing circuit 102 executes the subsequent layer 124-3 by relying on the reusable portion of the first layer 122 to perform at least one of the shared functions implemented in the first three security layers.

In the illustrated example of FIG. 2, the boot sequence ends with the interval T. During the interval T, the reusable part of the first layer 122 remains loaded in the persistent region of the memory circuit 104 to support execution of a subsequent layer 124-N loaded in the non-persistent region of the memory circuit 104 to implement an Nth security layer (e.g., where N represents any positive integer). For example, the processing circuit 102 executes the subsequent layer 124-N based in part using the reusable portion of the first layer 122 to implement at least one of the shared function supported by each of the previous security layers.

Figure 3:
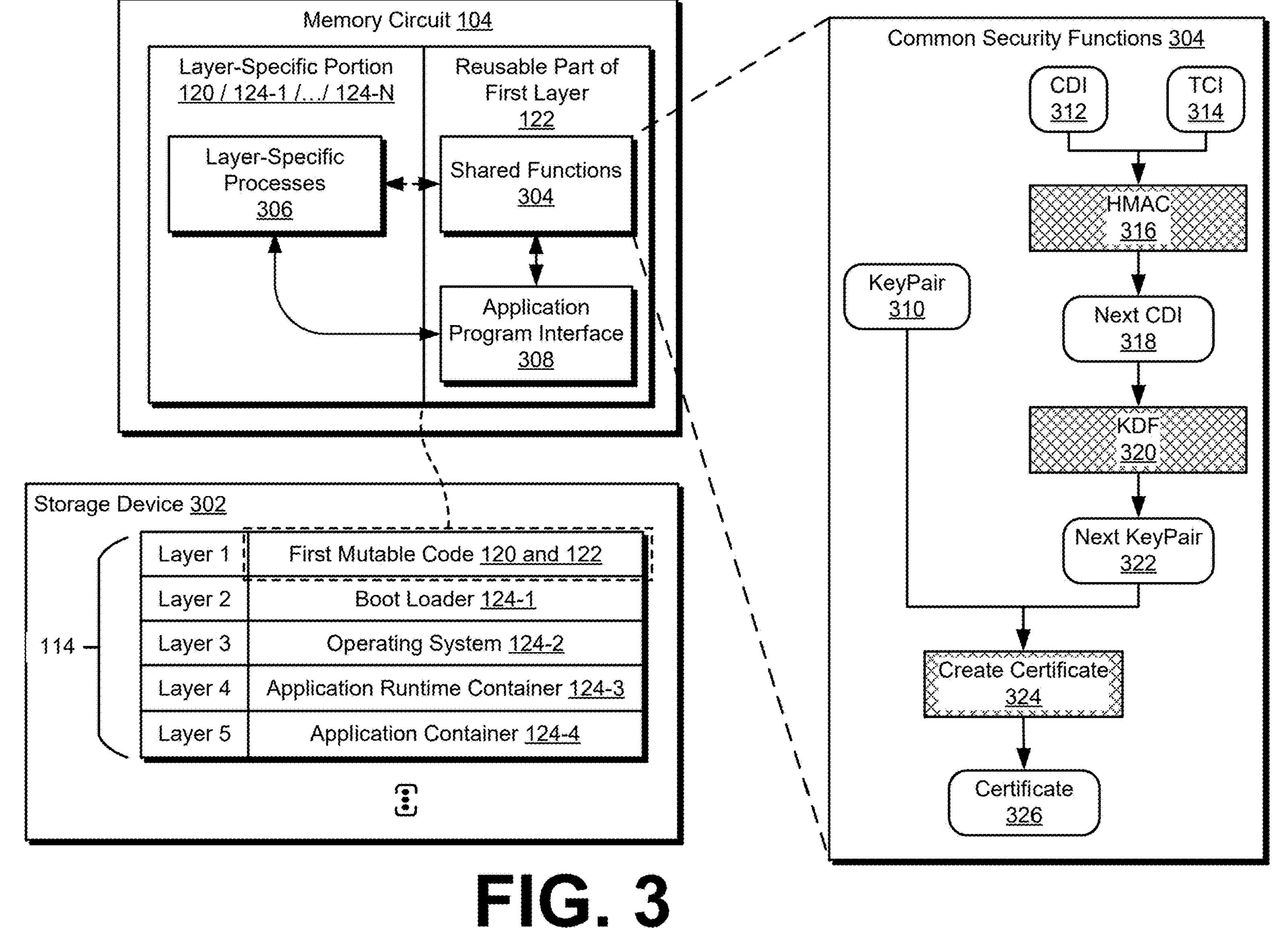
FIG. 3 is a block diagram of a non-limiting example system that implements shared functions using mutable code efficiencies in measured secure boot for hardware root of trust.

FIG. 3 is a block diagram of a non-limiting example system 300 that implements shared functions using mutable code efficiencies in measured secure boot for hardware root of trust. The system 300 represents an example subsystem or partial implementation of the system 100.

The system 300 includes the memory circuit 104 operatively coupled to a storage device 302. For example, when the memory circuit 104 is loaded with a portion of the security framework firmware 114 for processing, the system 100 transfers that portion of the security framework firmware 114 from the storage device 302 to the memory circuit 104. By definition, the storage device 302 maintains data (e.g., the security framework firmware 114) in-between power-cycles. The storage device 302 enables the system 300 to be ready to establish a hardware root of trust among multiple security layers of a security framework whenever the system 300 starts-up (e.g., during a boot sequence).

In one or more aspects, the processing circuit 102 loads the memory circuit 104 from data maintained in the storage device 302 to sequentially implement the security layers for establishing the hardware root of trust one security layer at a time. The processing circuit 102 loads the memory circuit 104 with reusable data maintained in the storage device 302 (e.g., a reusable portion of the security framework firmware 114) for executing at least one shared function implemented by each of the security layers. While preserving the reusable data in the memory circuit 104, the processing circuit 102 loads the memory circuit 104 with additional data maintained in the storage device 302 (e.g., a current layer-specific portion of the security framework firmware 114) to implement a current security layer. After implementing the current security layer, the processing circuit 102 overwrites the layer-specific data loaded the memory circuit 104 with different data maintained in the storage device 302 (e.g., a subsequent layer-specific portion of the security framework firmware 114) to implement a subsequent security layer. The processing circuit 102 continues to preserve the reusable data in the memory circuit 104 to enable the subsequent security layer to execute the shared function.

As illustrated in FIG. 3, the memory circuit 104 is divided into a persistent region and a non-persistent region. The reusable part of the first layer 122 is maintained in the persistent region of the memory circuit 104, and each layer-specific portion of the security framework firmware 114 (e.g., the remaining part of the first layer 120, the subsequent layer 124-1, . . . , the subsequent layer 124-4) is stored in the non-persistent region and available for processing, one layer at a time. The reusable part of the first layer 122 includes instructions, which when executed by the processing circuit 102, implement one or more shared functions 304 (e.g., security and cryptographic functions) at each of the security layers. The shared functions 304, for instance, are used throughout the security framework firmware 114 to enable each current layer being implemented to provide evidence that contains a footprint of a subsequent layer. As one example, each layer-specific portion of the security framework firmware 114 includes instructions, which when executed by the processing circuit 102, implement one or more layer-specific processes 306, which depend on the shared functions 304. An application program interface 308 is also included among the reusable part of the first layer 122.

The shared functions 304 include various tools or services utilized by the layer-specific processes 306 to implement each of individual security layers. These tools or services are described below in greater detail in the context of a working example depicted in FIG. 3. As mentioned below, in at least one example, the shared functions 304 are configured to generate a next compound device identifier used to implement a subsequent security layer. In at least one aspect, the shared functions 304 are configured to generate a next device identifier key pair used to implement a subsequent security layer. In one or more variations, the shared functions 304 are configured to generate a current certificate that binds a device identity to an initial state of the current security layer.

The application program interface 308 includes mutable code (e.g., instructions, code, data) to enable the layer-specific processes 306 to access the shared function from a current security layer being implemented by the processing circuit 102. Each security layer defined by the security framework firmware 114 includes mutable code that uses the application program interface 308 to implement the shared functions 304 during execution and implementation of the layer-specific processes 306 executed for that layer. In at least one example, the remaining part of the first layer 120 has direct access to the shared functions 304 (e.g., outside the application program interface 308) based on a close coupling of the layer-specific processes 306 implemented by the first layer and the shared functions 304 made accessible to each subsequent layer.

In one or more implementations, the application program interface 308 implements a library of the shared functions 304 that are accessible to each of the security layers. For example, the application program interface 308 receives inputs from the layer-specific processes 306, such as a keypair 310, a common device identifier (CDI) 312, and a trusted computing base component identifier (TCI) 314. The application program interface 308 outputs one or more results generated based on the inputs to enable the layer-specific processes 306 to perform layer-specific tasks. For example, the shared functions 304 are accessible from the library as a one-way hash-based message authentication code (HMAC) 316 function, a key derivation function (KDF) 320, and a create certificate 324 function. In response to executing the shared functions 304 (e.g., the HMAC 316, the KDF 320, and the create certificate 324), the application program interface 308 outputs a next CDI 318, a next keypair 322, and a certificate 326.

The keypair 310 is derived based on a public key and a private key used for cryptographic operations that ensure security and authentication. The CDI 312 is a unique identifier derived from device-specific information, serving as a foundational element for establishing trust. The TCI 314 is a value representing a current state of the device, used to verify the integrity of the system. The HMAC 316 generates a unique code based on the CDI 312 and the TCI 314. The HMAC 316 outputs the unique code as the next CDI 318. The next CDI 318 is a new CDI generated by the HMAC 316, reflecting the updated state of the device. The KDF 320 is a cryptographic algorithm that generates new cryptographic keys from a given input. The KDF 320 outputs the next keypair 322 based on the next CDI 318. The next keypair 322 is the new set of cryptographic keys generated by the KDF 320, based on the next CDI 318, ensuring continued secure operations. The create certificate 324 function generates a digital certificate, which binds a public key to an entity, providing a means of verifying the entity's identity. The create certificate 324 function generates the certificate 326 based on the keypair 310 and the next keypair 322. The certificate 326 is the new digital certificate created by the create certificate 324 function, based on the keypair 310 and the next keypair 322, providing updated verification of the entity's identity.

In the example depicted in FIG. 3, the security framework firmware 114 includes six security layers. Various other examples of the security framework firmware 114 exist, including various DICE based security frameworks that use fewer or more than six security layers. Each of the security layers is responsible for initializing part of the security framework based in part on executing the shared functions 304. In addition, except for a last or final security layer of the security framework, each of the security layers is also responsible for performing measurements used to initialize a subsequent layer based in part on executing the shared functions 304. In one or more examples, invoking the shared functions 304 from the layer-specific processes 306 executed at each security layer implements a secure and trusted boot process by continuously generating new identifiers, keypairs, and certificates at each layer.

For example, a first security layer is labeled "Layer 1" and includes first mutable code portion of the security framework firmware 114, which corresponds to the remaining part of the first layer 120 and the reusable part of the first layer 122. The inputs to Layer 1 include the keypair 310, the CDI 312, and the TCI 314. In one or more implementations, the keypair 310, and the CDI 312 are received from the boot ROM 112. The boot ROM 112 includes immutable code that when executed implements Layer 0, which upon verifying authenticity of the remaining part of the first layer 120 and the reusable part of the first layer 122, invokes the security framework firmware 114 and execution of Layer 1. The boot ROM 112 verifies the authenticity of the remaining part of the first layer 120 and the reusable part of the first layer 122 based on measuring the remaining part of the first layer 120 and the reusable part of the first layer 122 together, as coherent portion, layer, part, or section of the security framework firmware 114. The TCI 314 is received in response to performing a measurement of a subsequent layer of the security framework firmware (e.g., the subsequent layer 124-1). Based on these inputs, the Layer 1 executes the shared functions 304. The HMAC 316 generates the next CDI 318 based on the CDI 312 and the TCI 314. The KDF 320 generates the next keypair 322 based on the next CDI 318. The create certificate 324 function generate the certificate 326 based on the keypair 310 and the next keypair 322. The outputs from Layer 1 are the next CDI 318, the next keypair 322, and the certificate 326.

A second security layer is labeled "Layer 2" and includes a portion of the security framework firmware 114, which corresponds the subsequent layer 124-1. Layer 2, in one or more implementations is a boot loader, receives the next CDI 318, the next keypair 322, and the certificate 326 from Layer 1 as inputs. Based on these inputs, the Layer 2 executes the shared functions 304. For example, the Layer 2 sets the CDI 312 to the value of the next CDI 318 received as input from the Layer 1 and sets the keypair 310 to the value of the next keypair 322 also received as input from the Layer 1. The TCI 314 is obtained for Layer 2 based on a measurement of a subsequent layer of the security framework firmware (e.g., the subsequent layer 124-2). During execution of the subsequent layer 124-1, the HMAC 316 is used to generate a new version of the next CDI 318 based on the new versions of the CDI 312 and the TCI 314. The KDF 320 is used to generate a new version of the next keypair 322 based on the new version of the next CDI 318. The create certificate 324 function generates a new version of the certificate 326 based on the new version of the keypair 310 and the new version of the next keypair 322. The outputs from Layer 2 are the layer 2 version of the next CDI 318, the next keypair 322, and the certificate 326.

A third security layer is labeled "Layer 3" and includes a (e.g., high-level) operating system portion of the security framework firmware 114, which corresponds the subsequent layer 124-2. Layer 3 receives the next CDI 318, the next keypair 322, and the certificate 326 from Layer 2 as inputs. Based on these inputs, the Layer 3 executes the shared functions 304. For example, the Layer 3 sets the CDI 312 to the value of the next CDI 318 received as input from the Layer 2 and sets the keypair 310 to the value of the next keypair 322 also received as input from the Layer 2. The TCI 314 is obtained for Layer 3 based on a measurement of a subsequent layer of the security framework firmware (e.g., the subsequent layer 124-3). During execution of the subsequent layer 124-2, the HMAC 316 is used to generate a new version of the next CDI 318 based on the new versions of the CDI 312 and the TCI 314. The KDF 320 is used to generate a new version of the next keypair 322 based on the new version of the next CDI 318. The create certificate 324 function generates a new version of the certificate 326 based on the new version of the keypair 310 and the new version of the next keypair 322. The outputs from Layer 3 are the layer 3 version of the next CDI 318, the next keypair 322, and the certificate 326.

Fourth, fifth, and sixth security layers represent application layers where application firmware, drivers, threads, services, or other application executable code is executed. A fourth security layer is labeled "Layer 4" and includes an application runtime container portion of the security framework firmware 114, which corresponds the subsequent layer 124-3. A fifth security layer is labeled "Layer 5" and includes an application container portion of the security framework firmware 114, which corresponds the subsequent layer 124-4. Each of these layers are measured and verified to ensure the integrity and security of the system 300 and the system 100. For example, Layer 4 receives the next CDI 318, the next keypair 322, and the certificate 326 from Layer 3 as inputs. Based on these inputs, the Layer 4 executes the shared functions 304 to generate a new version of the next CDI 318, the next keypair 322, and the certificate 326. A similar process is performed by the Layer 5 based on the next CDI 318, the next keypair 322, and the certificate 326 received from Layer 4 as inputs. Likewise, additional subsequent layers (e.g., the Layer N) executes the shared functions 304 based on the next CDI 318, the next keypair 322, and the certificate 326 received from Layer 5 or other previous layer as inputs.

Figure 4:
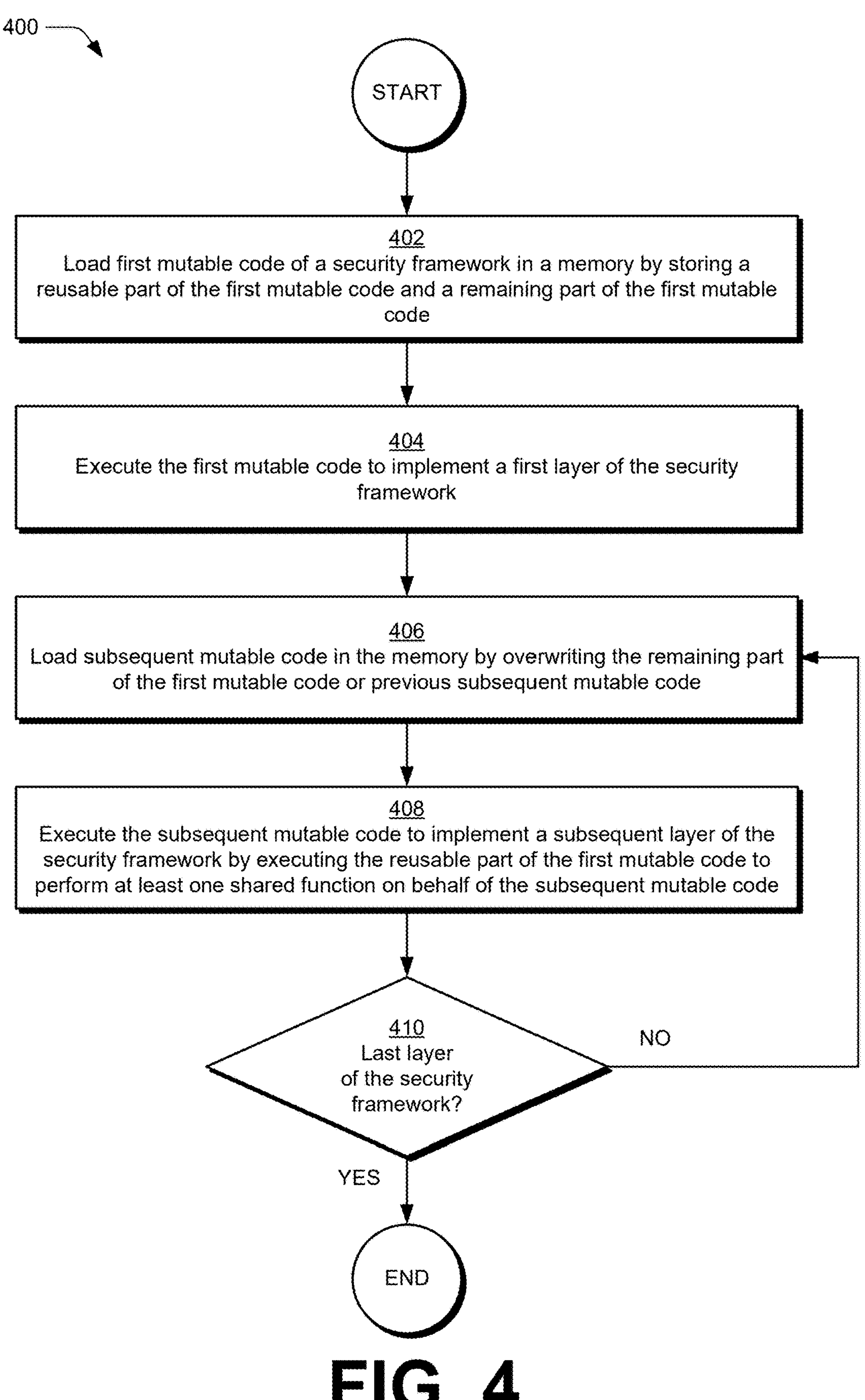
FIG. 4 is a flow diagram illustrating an example process for using mutable code efficiencies in measured secure boot for hardware root of trust.

FIG. 4 is a flow diagram illustrating an example process 400 for using mutable code efficiencies in measured secure boot for hardware root of trust. The process 400 is implemented by the processing circuit 102, the memory circuit 104, or both. For ease of illustration, the process 400 is described in the context of being performed by the processing circuit 102. As one example, execution of the process 400 (e.g., by the system 100) implements a security framework for establishing a hardware root of trust among multiple security layers defined by the security framework firmware 114.

The process 400 begins at "START" when measured secure boot is initiated (e.g., when power to the system 100 is reset). A hardware root of trust is defined for the system 100 by executing immutable code (e.g., the boot ROM 112), which then causes the process 400 to proceed to block 402. At block 402, first mutable code of a security framework is loaded in a memory by storing a reusable part of the first mutable code and a remaining part of the first mutable code. Execution of the boot ROM 112, for instance, configures the processing circuit 102 to load part of the security framework firmware 114, including the reusable part of the first layer 122 and the remaining part of the first layer 120, in the memory circuit 104 for processing.

Next, at block 404, the first mutable code is executed to implement a first layer of the security framework. In at least one implementation, the processing circuit 102 executes the remaining part of the first layer 120 in combination with the reusable part of the first layer 122 to implement the first layer of the security framework.

Then, at block 406, subsequent mutable code is loaded in the memory by overwriting the remaining part of the first mutable code or previous subsequent mutable code. For example, responsive to executing the remaining part of the first layer 120 in combination with the reusable part of the first layer 122 to implement the first layer of the security framework, the memory circuit 104 is loaded with second mutable code used to implement the second layer of the security framework. In one or more aspects, the processing circuit 102 loads the subsequent layer 124-1 in the memory circuit 104 by overwriting the remaining part of the first layer 120.

Next, at block 408, the subsequent mutable code is executed to implement a subsequent layer of the security framework by executing the reusable part of the first mutable code to perform at least one function on behalf of the subsequent mutable code. In at least one implementation, the processing circuit 102 executes the subsequent layer 124-1 in combination with the reusable part of the first layer 122 to implement the second layer of the security framework. The layer-specific processes 306 defined by the subsequent layer 124-1 of the security framework firmware 114 input information into the application program interface 308 to obtain results generated by the shared functions 304 (e.g., to perform device identification by providing evidence that contains a footprint of a subsequent layer, to execute various security and cryptographic functions) from the subsequent layer 124-1.

Then, at block 410, the process 400 includes determining whether the subsequent layer implemented at block 408 is a last layer of the security framework. For example, the processing circuit 102 checks the security framework firmware 114 to determine whether a second, subsequent layer follows the subsequent layer in the security framework. If there are no more security layers, the process 400 proceeds from the "YES" output of the block 410 to "End" where the process 400 stops. Alternatively, If there is at least one more security layer left to be implemented, the process 400 returns to the block 406 by following the "NO" path out of the block 410, where another layer (e.g., the subsequent layer 124-2, . . . , the subsequent layer 124-N) is loaded in the memory circuit 104 at the block 406 and is executed at the block 408 by the processing circuit 102 to implement the next layer. In one or more examples, execution of the subsequent mutable code at block 408 performs the decision at block 410 to determine whether to loop back to block 406 to process another layer of the security framework, or whether to terminate the process 400 if the execution at block 408 is for a final layer in the security framework. For example, when a final layer a layer in the security framework is implemented by the processing circuit 102, execution of the layer-specific portion of the security framework firmware 114 in block 408 generates a signal (e.g., a flag, a bit, a message) identifying a current layer being implemented as the final layer of the security framework.

Figure 5:
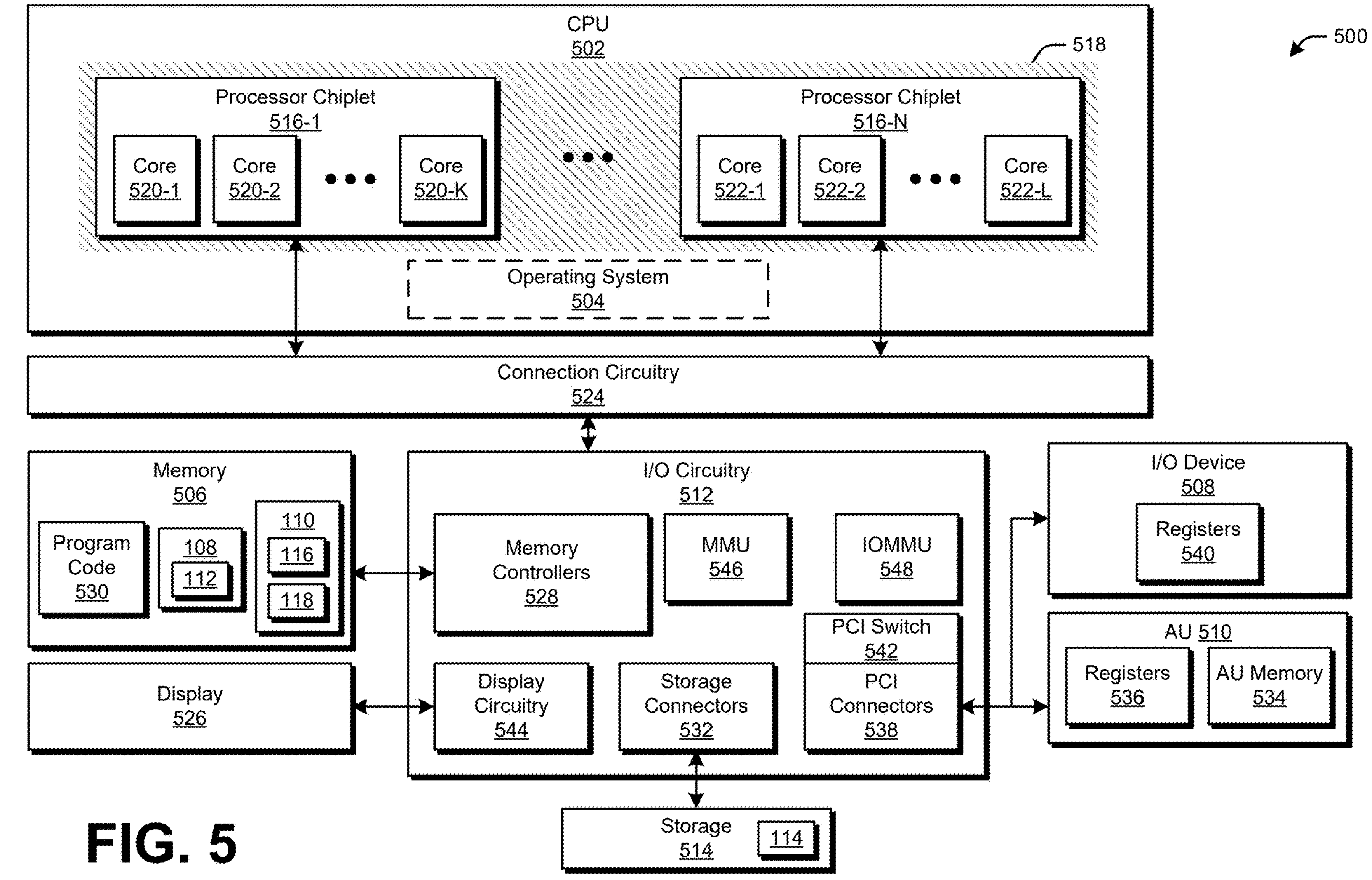
FIG. 5 includes a processing system configured to execute one or more applications using mutable code efficiencies in measured secure boot for hardware root of trust.

FIG. 5 includes a processing system 500 configured to execute one or more applications, such as compute applications (e.g., machine-learning applications, neural network applications, high-performance computing applications, databasing applications, gaming applications), graphics applications, and the like. Examples of devices in which the processing system is implemented include, but are not limited to, a server computer, a personal computer (e.g., a desktop or tower computer), a smartphone or other wireless phone, a tablet or phablet computer, a notebook computer, a laptop computer, a wearable device (e.g., a smartwatch, an augmented reality headset or device, a virtual reality headset or device), an entertainment device (e.g., a gaming console, a portable gaming device, a streaming media player, a digital video recorder, a music or other audio playback device, a television, a set-top box), an Internet of Things (IoT) device, an automotive computer or computer for another type of vehicle, a networking device, a medical device or system, and other computing devices or systems.

In the illustrated example, the processing system 500 includes a central processing unit (CPU) 502. In one or more implementations, the CPU 502 is configured to run an operating system (OS) 504 that manages the execution of applications. For example, the OS 504 is configured to schedule the execution of tasks (e.g., instructions) for applications, allocate portions of resources (e.g., system memory 506, CPU 502, input/output (I/O) device 508, accelerator unit (AU) 510, storage 514) for the execution of tasks for the applications, provide an interface to I/O devices (e.g., I/O device 508) for the applications, or any combination thereof.

In this example, the non-volatile memory 108 and the volatile memory 110 are depicted in the memory 506, which is an example of the memory circuit 104. The security framework firmware 114 is also depicted in this example as being maintained in the storage 514. When the boot ROM 112 is executed by the CPU 502, layer-specific portions, and a reusable portion of the security framework firmware 114 are loaded from the storage 514 and into, respectively, the non-persistent memory 116 and the persistent memory 118. In variations, however, the non-volatile memory 108, the volatile memory 110, the security framework firmware 114, and/or aspects thereof are included in and/or implemented by one or more different components of the processing system 500, such as the CPU 502, the memory 506, the I/O device 508, the AU 510, the I/O circuitry 512, the storage 514, and so forth. In at least one implementation, the non-volatile memory 108, the volatile memory 110, the security framework firmware 114, and/or portions thereof are included in at least two of the depicted components of the processing system 500. By way of example, aspects of the persistent memory 118 is included in or otherwise implemented by a memory circuit (e.g., the memory circuit 104, a cache, etc.) implemented within the CPU 502, and the non-persistent memory 116 is included or otherwise implemented in the memory 506.

The CPU 502 includes one or more processor chiplets 516, which are communicatively coupled together by a data fabric 518 in one or more implementations. Each of the processor chiplets 516, for example, includes one or more processor cores 520, 522 configured to concurrently execute one or more series of instructions, also referred to herein as "threads," for an application. Further, the data fabric 518 communicatively couples each processor chiplet 516-N of the CPU 502 such that each processor core (e.g., processor cores 520) of a first processor chiplet (e.g., 516-1) is communicatively coupled to each processor core (e.g., processor cores 522) of one or more other processor chiplets 516. Though the example embodiment presented in FIG. 5 shows a first processor chiplet (516-1) having three processor cores (520-1, 520-2, 520-K) representing a K number of processor cores 522 and a second processor chiplet (516-N) having three processor cores (e.g., 522-1, 522-2, 522-L) representing an L number of processor cores 522, in other implementations (L being an integer number greater than or equal to one), each processor chiplet 516 may have any number of processor cores 520, 522. For example, each processor chiplet 516 can have the same number of processor cores 520, 522 as one or more other processor chiplets 516, a different number of processor cores 520, 522 as one or more other processor chiplets 516, or both.

Examples of connections which are usable to implement data fabric include but are not limited to, buses (e.g., a data bus, a system, an address bus), interconnects, memory channels, through silicon vias, traces, and planes. Other example connections include optical connections, fiber optic connections, and/or connections or links based on quantum entanglement.

Additionally, within the processing system 500, the CPU 502 is communicatively coupled to an I/O circuitry 512 by a connection circuitry 524. For example, each processor chiplet 516 of the CPU 502 is communicatively coupled to the I/O circuitry 512 by the connection circuitry 524. The connection circuitry 524 includes, for example, one or more data fabrics, buses, buffers, queues, and the like. The I/O circuitry 512 is configured to facilitate communications between two or more components of the processing system 500 such as between the CPU 502, system memory 506, display 526, universal serial bus (USB) devices, peripheral component interconnect (PCI) devices (e.g., I/O device 508, AU 510), storage 514, and the like.

As an example, system memory 506 includes any combination of one or more volatile memories and/or one or more non-volatile memories, examples of which include dynamic random-access memory (DRAM), static random-access memory (SRAM), non-volatile RAM, and the like. To manage access to the system memory 506 by CPU 502, the I/O device 508, the AU 510, and/or any other components, the I/O circuitry 512 includes one or more memory controllers 528. These memory controllers 528, for example, include circuitry configured to manage and fulfill memory access requests issued from the CPU 502, the I/O device 508, the AU 510, or any combination thereof. Examples of such requests include read requests, write requests, fetch requests, pre-fetch requests, or any combination thereof. That is to say, these memory controllers 528 are configured to manage access to the data stored at one or more memory addresses within the system memory 506, such as by CPU 502, the I/O device 508, and/or the AU 510.

When an application is to be executed by processing system 500, the OS 504 running on the CPU 502 is configured to load at least a portion of program code 530 (e.g., an executable file) associated with the application from, for example, a storage 514 into system memory 506. This storage 514, for example, includes a non-volatile storage such as a flash memory, solid-state memory, hard disk, optical disc, or the like configured to store program code 530 for one or more applications.

To facilitate communication between the storage 514 and other components of processing system 500, the I/O circuitry 512 includes one or more storage connectors 532 (e.g., universal serial bus (USB) connectors, serial AT attachment (SATA) connectors, PCI Express (PCIe) connectors) configured to communicatively couple storage 514 to the I/O circuitry 512 such that I/O circuitry 512 is capable of routing signals to and from the storage 514 to one or more other components of the processing system 500.

In association with executing an application, in one or more scenarios, the CPU 502 is configured to issue one or more instructions (e.g., threads) to be executed for an application to the AU 510. The AU 510 is configured to execute these instructions by operating as one or more vector processors, coprocessors, graphics processing units (GPUs), general-purpose GPUs (GPGPUs), non-scalar processors, highly parallel processors, artificial intelligence (AI) processors (also known as neural processing units, or NPUs), inference engines, machine-learning processors, other multithreaded processing units, scalar processors, serial processors, programmable logic devices (e.g., field-programmable logic devices (FPGAs)), or any combination thereof.

In at least one example, the AU 510 includes one or more compute units that concurrently execute one or more threads of an application and store data resulting from the execution of these threads in AU memory 534. This AU memory 534, for example, includes any combination of one or more volatile memories and/or non-volatile memories, examples of which include caches, video RAM (VRAM), or the like. In one or more implementations, these compute units are also configured to execute these threads based on the data stored in one or more physical registers 536 of the AU 510.

To facilitate communication between the AU 510 and one or more other components of processing system 500, the I/O circuitry 512 includes or is otherwise connected to one or more connectors, such as PCI connectors 538 (e.g., PCIe connectors) each including circuitry configured to communicatively couple the AU 510 to the I/O circuitry such that the I/O circuitry 512 is capable of routing signals to and from the AU 510 to one or more other components of the processing system 500. Further, the PCIe connectors 538 are configured to communicatively couple the I/O device 508 to the I/O circuitry 512 such that the I/O circuitry 512 is capable of routing signals to and from the I/O device 508 to one or more other components of the processing system 500.

By way of example and not limitation, the I/O device 508 includes one or more keyboards, pointing devices, game controllers (e.g., gamepads, joysticks), audio input devices (e.g., microphones), touch pads, printers, speakers, headphones, optical mark readers, hard disk drives, flash drives, solid-state drives, and the like. Additionally, the I/O device 508 is configured to execute one or more operations, tasks, instructions, or any combination thereof based on one or more physical registers 540 of the I/O device 508. In one or more implementations, such physical registers 540 are configured to maintain data (e.g., operands, instructions, values, variables) indicating one or more operations, tasks, or instructions to be performed by the I/O device 508.

To manage communication between components of the processing system 500 (e.g., AU 510, I/O device 508) that are connected to PCI connectors 538, and one or more other components of the processing system 500, the I/O circuitry 512 includes PCI switch 542. The PCI switch 542, for example, includes circuitry configured to route packets to and from the components of the processing system 500 connected to the PCI connectors 538 as well as to the other components of the processing system 500. As an example, based on address data indicated in a packet received from a first component (e.g., CPU 502), the PCI switch 542 routes the packet to a corresponding component (e.g., AU 510) connected to the PCI connectors 538.

Based on the processing system 500 executing a graphics application, for instance, the CPU 502, the AU 510, or both are configured to execute one or more instructions (e.g., draw calls) such that a scene including one or more graphics objects is rendered. After rendering such a scene, the processing system 500 stores the scene in the storage 514, displays the scene on the display 526, or both. The display 526, for example, includes a cathode-ray tube (CRT) display, liquid crystal display (LCD), light emitting diode (LED) display, organic light emitting diode (OLED) display, or any combination thereof. To enable the processing system 500 to display a scene on the display 526, the I/O circuitry 512 includes display circuitry 544. The display circuitry 544, for example, includes high-definition multimedia interface (HDMI) connectors, DisplayPort connectors, digital visual interface (DVI) connectors, USB connectors, and the like, each including circuitry configured to communicatively couple the display 526 to the I/O circuitry 512. Additionally or alternatively, the display circuitry 544 includes circuitry configured to manage the display of one or more scenes on the display 526 such as display controllers, buffers, memory, or any combination thereof.

Further, the CPU 502, the AU 510, or both are configured to concurrently run one or more virtual machines (VMs), which are each configured to execute one or more corresponding applications. To manage communications between such VMs and the underlying resources of the processing system 500, such as any one or more components of processing system 500, including the CPU 502, the I/O device 508, the AU 510, and the system memory 506, the I/O circuitry 512 includes memory management unit (MMU) 546 and input-output memory management unit (IOMMU) 548. The MMU 546 includes, for example, circuitry configured to manage memory requests, such as from the CPU 502 to the system memory 506. For example, the MMU 546 is configured to handle memory requests issued from the CPU 502 and associated with a VM running on the CPU 502. These memory requests, for example, request access to read, write, fetch, or pre-fetch data residing at one or more virtual addresses (e.g., guest virtual addresses) each indicating one or more portions (e.g., physical memory addresses) of the system memory 506. Based on receiving a memory request from the CPU 502, the MMU 546 is configured to translate the virtual address indicated in the memory request to a physical address in the system memory 506 and to fulfill the request. The IOMMU 548 includes, for example, circuitry configured to manage memory requests (memory-mapped I/O (MMIO) requests) from the CPU 502 to the I/O device 508, the AU 510, or both, and to manage memory requests (direct memory access (DMA) requests) from the I/O device 508 or the AU 510 to the system memory 506. For example, to access the registers 540 of the I/O device 508, the registers 536 of the AU 510, and/or the AU memory 534, the CPU 502 issues one or more MMIO requests. Such MMIO requests each request access to read, write, fetch, or pre-fetch data residing at one or more virtual addresses (e.g., guest virtual addresses) which each represent at least a portion of the registers 540 of the I/O device 508, the registers 536 of the AU 510, or the AU memory 534, respectively. As another example, to access the system memory 506 without using the CPU 502, the I/O device 508, the AU 510, or both are configured to issue one or more DMA requests. Such DMA requests each request access to read, write, fetch, or pre-fetch data residing at one or more virtual addresses (e.g., device virtual addresses) which each represent at least a portion of the system memory 506. Based on receiving an MMIO request or DMA request, the IOMMU 548 is configured to translate the virtual address indicated in the MMIO or DMA request to a physical address and fulfill the request.

In variations, the processing system 500 can include any combination of the components depicted and described. For example, in at least one variation, the processing system 500 does not include one or more of the components depicted and described in relation to FIG. 5. Additionally or alternatively, in at least one variation, the processing system 500 includes additional and/or different components from those depicted. The 500 is configurable in a variety of ways with different combinations of components in accordance with the described techniques.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, aspects of the boot ROM 112, the security framework firmware 114, the shared functions 304, the layer-specific processes 306, the application program interface 308, the HMAC 316, the KDF 320, and the create certificate 324 function) are implemented in any of a variety of different manners such as hardware circuitry, software or firmware executing on a programmable processor, or any combination of two or more of hardware, software, and firmware. The methods provided are implemented in any of a variety of devices, such as a general-purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general-purpose computer or a processor. Examples of non-transitory computer-readable storage mediums include a read-only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A system comprising:

a volatile memory circuit having a first region that persistently stores a reusable portion of instructions executed during a boot sequence for establishing a hardware root of trust among multiple security layers of a security framework, and a second region that is overwritten during the boot sequence with each layer-specific portion of the instructions executed sequentially to implement a corresponding security layer based on the reusable portion; and a processing circuit that sequentially establishes the hardware root of trust one security layer at a time by loading the second region of the volatile memory with a current layer-specific portion of the instructions that are executed in combination with the reusable portion of the instructions to implement a current security layer.

2. The system of claim 1, wherein the processing circuit executes the current layer-specific portion of the instructions in combination with the reusable portion of the instructions to implement the current security layer prior to overwriting the second region of the volatile memory with a subsequent layer-specific portion of the instructions that are executed in combination with the reusable portion of the instructions to implement a subsequent security layer.

3. The system of claim 1, wherein the reusable portion of the instructions include mutable code for executing at least one shared function to implement each of the security layers.

4. The system of claim 3, wherein the mutable code enables an application program interface for accessing the shared function from the current security layer.

5. The system of claim 3, wherein the shared function generates a next compound device identifier used to implement a subsequent security layer.

6. The system of claim 5, wherein the shared function further generates a next device identifier key pair used to implement the subsequent security layer.

7. The system of claim 6, wherein the shared function further generates a current certificate that binds a device identity to an initial state of the current security layer.

8. A system comprising:

a storage device including instructions for establishing a hardware root of trust among multiple security layers of a security framework;

a memory circuit loaded with a reusable portion of the instructions for executing at least one shared function implemented by each of the security layers, and a layer-specific portion of the instructions for implementing a corresponding security layer based on the shared function; and a processing circuit that implements the security layers to sequentially establish the hardware root of trust one security layer at a time by loading the memory circuit with the layer-specific portion of the instructions that are executed to implement a current security layer prior to loading the memory circuit with the layer-specific portion of the instructions that are executed to implement a subsequent security layer.

9. The system of claim 8, wherein the instructions comprise firmware executed by the processing circuit to perform a boot sequence that establishes the hardware root of trust.

10. The system of claim 8, wherein the security framework is a Device Identifier Composition Engine based security framework that establishes the hardware root of trust to be a chain-of-trust established between each of the security layers.

11. The system of claim 8, wherein the reusable portion of the instructions enables an application program interface accessed by the layer-specific portion of the instructions being executed to implement the current security layer.

12. The system of claim 8, wherein the reusable portion of the instructions comprise a reusable part of first mutable code for implementing a first security layer.

13. The system of claim 8, wherein the processing circuit implements the security layers to sequentially establish the hardware root of trust one security layer at a time by overwriting the layer-specific portion of the instructions that are loaded in the memory circuit to implement the current security layer with the layer-specific portion of the instructions that are executed to implement the subsequent security layer.

14. The system of claim 8, wherein the memory circuit comprises:

a volatile memory circuit having a persistent region that stores the reusable portion of the instructions and a non-persistent region that stores the layer-specific portion of the instructions of the current security layer.

15. The system of claim 14, wherein the memory circuit further comprises:

a non-volatile memory circuit that stores a boot ROM for defining a system hardware identifier used by the shared function.

16. The system of claim 15, wherein the processing circuit executes the boot ROM to store the system hardware identifier in the volatile memory circuit with the reusable portion of the instructions.

17. The system of claim 16, wherein the processing circuit stores the system hardware identifier in the volatile memory circuit with the reusable portion of the instructions prior to executing the layer-specific portion of the instructions for implementing a first security layer.

18. A method for implementing a security framework among multiple security layers, the method comprising:

loading, by a computing device, first mutable code in a memory of the computing device by storing a reusable part of the first mutable code and a remaining part of the first mutable code;

responsive to executing the first mutable code to implement a first layer of the security framework, loading, by the computing device, subsequent mutable code in the memory by overwriting the remaining part of the first mutable code; and executing, by the computing device, the subsequent mutable code to implement a subsequent layer of the security framework by executing the reusable part of the first mutable code to perform at least one security function on behalf of the subsequent mutable code.

19. The method of claim 18, further comprising:

determining that a second subsequent layer follows the subsequent layer in the security framework;

responsive to executing the subsequent mutable code to implement the subsequent layer, loading, by the computing device, second subsequent mutable code in the memory by overwriting the subsequent mutable code; and executing, by the computing device, the second subsequent mutable code to implement the second subsequent layer by executing the reusable part of the first mutable code to perform the at least one security function on behalf of the second subsequent mutable code.

20. The method of claim 18, wherein the first mutable code and the subsequent mutable code represent portions of firmware configured to establish a hardware root of trust among the security layers during a boot sequence.

* * * * *